United States Patent
Komai et al.

(10) Patent No.: US 10,081,872 B2
(45) Date of Patent: Sep. 25, 2018

(54) HYDROGEN PRODUCTION SYSTEM AND METHOD FOR PRODUCING HYDROGEN

(71) Applicant: Kabushiki Kaisha Toshiba, Minato-Ku (JP)

(72) Inventors: Masafumi Komai, Yokohama (JP); Masahiko Yamada, Setagaya (JP); Tsuneji Kameda, Ota (JP); Yuko Kawajiri, Yokohama (JP); Seiji Fujiwara, Kamakura (JP); Hisao Watanabe, Yokohama (JP); Hiroyuki Yamauchi, Yokohama (JP); Yasuo Takagi, Gifu (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 423 days.

(21) Appl. No.: 14/816,455

(22) Filed: Aug. 3, 2015

(65) Prior Publication Data

US 2016/0040310 A1 Feb. 11, 2016

(30) Foreign Application Priority Data

Aug. 8, 2014 (JP) ................. 2014-162431

(51) Int. Cl.
C25B 15/02 (2006.01)
C25B 1/04 (2006.01)
C25B 1/02 (2006.01)

(52) U.S. Cl.
CPC ............... *C25B 15/02* (2013.01); *C25B 1/02* (2013.01); *C25B 1/04* (2013.01); *Y02E 60/366* (2013.01); *Y02E 70/10* (2013.01); *Y02P 20/133* (2015.11)

(58) Field of Classification Search
CPC .................. C25B 1/02–1/10; C25B 15/02
See application file for complete search history.

(56) References Cited

U.S. PATENT DOCUMENTS

| 8,709,221 B1 | 4/2014 | Smith | |
|---|---|---|---|
| 2014/0079593 A1 | 3/2014 | Naito et al. | |
| 2014/0284220 A1* | 9/2014 | Sala | B01D 53/326 205/629 |

FOREIGN PATENT DOCUMENTS

| JP | 2002-519513 A | 7/2002 |
|---|---|---|
| JP | 2002-348694 | 12/2002 |
| JP | 2005-281716 | 10/2005 |

(Continued)

OTHER PUBLICATIONS

Office Action dated Jun. 27, 2016 in Canadian Patent Application No. 2,899,581.

*Primary Examiner* — Nicholas A Smith
(74) *Attorney, Agent, or Firm* — Oblon, McClelland, Maier & Neustadt, L.L.P.

(57) ABSTRACT

A hydrogen production system that achieves a highly-efficient hydrogen production operation even when a time-varying electric power source is used is provided. A hydrogen production system includes a capacitor inputting electric power energy from a renewable power supply, and storing electric power, a pulse voltage generation unit generating a pulse voltage having a set amplitude and a set cyclic period by using the electric power stored in the capacitor, and an electrolytic cell applying the generated pulse voltage, and generating hydrogen by high temperature steam electrolysis by using steam supplied into the electrolytic cell.

4 Claims, 8 Drawing Sheets

(56) References Cited

FOREIGN PATENT DOCUMENTS

| JP | 2006-37214 A | 2/2006 | | |
|----|----|----|----|----|
| JP | 2013-49600 | 3/2013 | | |
| WO | WO-2013053858 A1 * | 4/2013 | ........... | B01D 53/326 |

* cited by examiner

HYDROGEN PRODUCTION SYSTEM AND METHOD FOR PRODUCING HYDROGEN

CROSS-REFERENCE TO RELATED APPLICATION

This application is based upon and claims the benefit of priority from Japanese Patent application No. 2014-162431, filed on Aug. 8, 2014, the entire content of which is incorporated herein by reference.

BACKGROUND OF THE INVENTION

Field of the Invention

Embodiments of the present invention relate to a technique for producing hydrogen in which hydrogen is generated by using high temperature steam electrolysis.

Related Art

Realization of a hydrogen energy society using hydrogen as an energy medium has attracted attention. As one of technologies for producing hydrogen, a high temperature steam electrolysis is widely known. The high temperature steam electrolysis is a method in which hydrogen and oxygen are generated by electrolyzing steam with a high temperature (normally, 500° C. or more).

The method has an advantage to reduce an amount of electricity required for electrolysis by electrolyzing steam under a high temperature environment as compared to electrolysis of water. Because of the characteristic as described above, an same amount of hydrogen can be obtained by using smaller electricity than that of the room temperature water electrolysis by about 30%. Thus, hydrogen can be produced at high energy efficiency.

Furthermore, since water is a raw material, it is possible to produce hydrogen without discharging carbon dioxide at all if electric power obtained by renewable energy that generates no carbon dioxide and a heat source that generates no carbon dioxide are used.

In the high temperature steam electrolysis, a hydrogen electrode and an oxygen electrode are provided on both sides of a solid oxide electrolyte to constitute an electrolytic cell. High temperature steam is supplied to the hydrogen electrode side, and an electrolytic voltage is applied to the both electrodes, so that the steam is decomposed to hydrogen and oxygen.

Conventionally, various hydrogen production apparatuses that safely and efficiently produce hydrogen by the high temperature steam electrolysis have been studied. A technology to generate hydrogen efficiently by the high temperature electrolysis with lower energy has been disclosed (for example, Japanese Patent Laid-Open Nos. 2002-348694, 2005-281716, 2013-49600).

In the above high temperature steam electrolysis, by performing an electrolytic reaction at a thermoneutral point at which an endothermic reaction in a process in which hydrogen and oxygen are generated from steam by the electrolytic reaction, and an exothermic reaction by electrical resistance of the electrolytic cell itself become almost equal to each other, it is possible to minimize energy input from outside, and produce hydrogen at high efficiency.

However, when the renewable energy is used as an electric power source for the electrolytic reaction, there is a problem that it is difficult to maintain an applied voltage to the electrolytic cell around the thermoneutral point since the electric power obtained by the renewable energy varies with time.

Also, when a time-varying electric power source is used, the electrolytic cell may be brought into a steam starvation state (steam starvation) or a surplus steam state due to a change in a steam rate used for the electrolytic reaction. Thus, there is a problem that it is difficult to perform an efficient hydrogen production operation according to the steam rate.

SUMMARY OF THE INVENTION

To solve the above problems, it is an object of present invention to provide a technique for producing hydrogen that achieves a highly-efficient hydrogen production operation even when a time-varying electric power source is used.

A hydrogen production system according to an embodiment of the present invention includes a capacitor inputting electric power energy from a renewable power supply, and storing electric power, a pulse voltage generation unit generating a pulse voltage having a set amplitude and a set cyclic period by using the electric power stored in the capacitor, and an electrolytic cell applying the generated pulse voltage, and generating hydrogen by high temperature steam electrolysis by using steam supplied into the electrolytic cell.

A method for producing hydrogen according to an embodiment of the present invention includes the steps of: inputting electric power energy from a renewable power supply to store electric power in a capacitor; generating a pulse voltage having a set amplitude and a set cyclic period by using the stored electric power; and applying the generated pulse voltage to generate hydrogen by high temperature steam electrolysis in an electrolytic cell by using steam supplied into the electrolytic cell.

DESCRIPTION OF THE EMBODIMENTS (First Embodiment)

Hereinafter, embodiments of the present invention are described based on the accompanying drawings.

Figure 1:
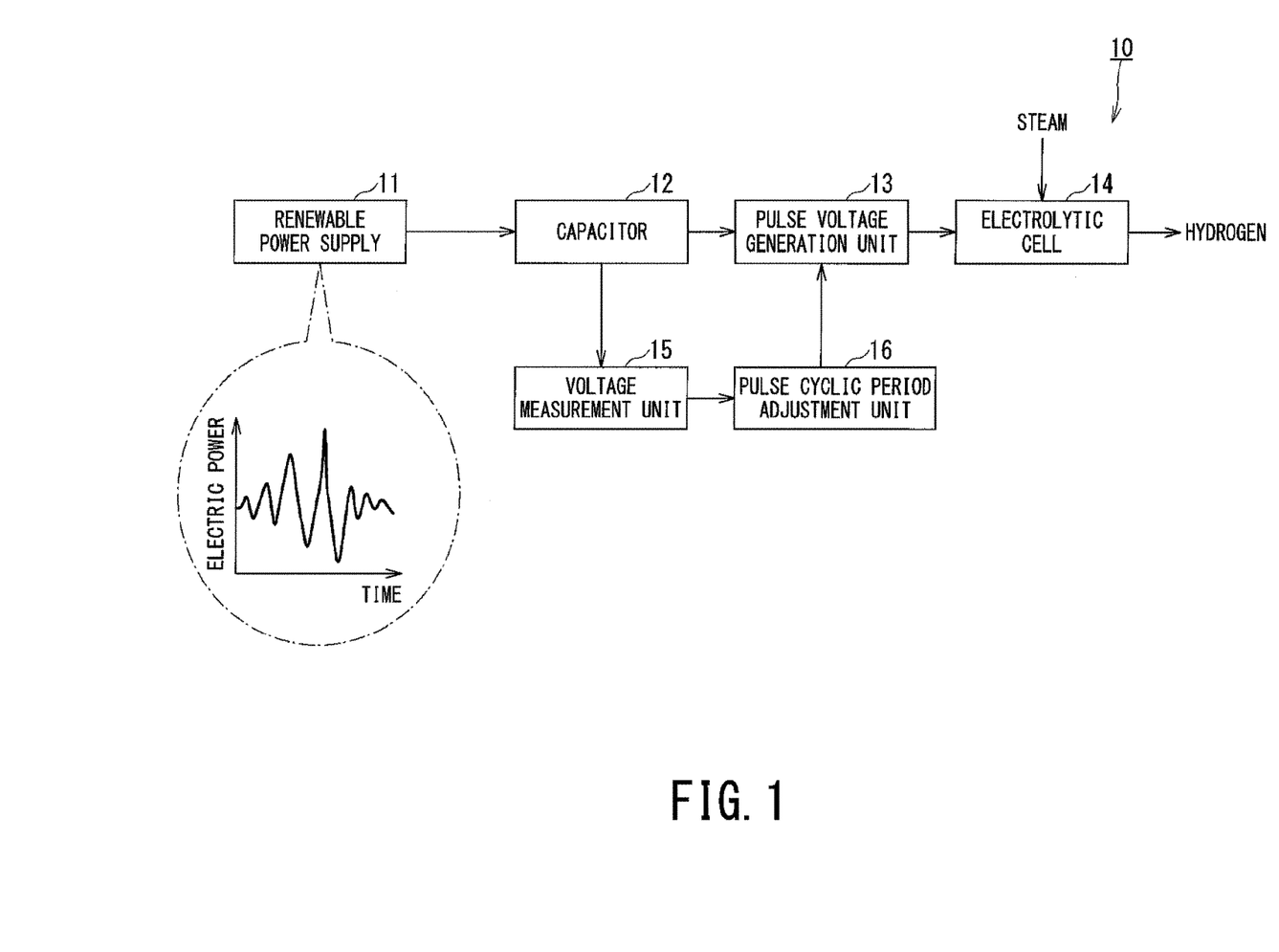
FIG. 1 is a configuration diagram of a hydrogen production system according to a first embodiment.

As shown in FIG. 1, a hydrogen production system 10 according to a first embodiment includes a capacitor 12, a pulse voltage generation unit 13, and an electrolytic cell 14. Electric power energy from a renewable power supply 11 is inputted into the capacitor 12, and the capacitor 12 stores electric power. The pulse voltage generation unit 13 generates a pulse voltage having a set amplitude and a set cyclic period by using the electric power stored in the capacitor 12. The generated pulse voltage is applied to the electrolytic cell 14, and the electrolytic cell 14 generates hydrogen by high temperature steam electrolysis by using steam supplied into the electrolytic cell.

The hydrogen production system 10 further includes a voltage measurement unit 15 and a pulse cyclic period adjustment unit 16. The voltage measurement unit 15 measures a voltage value of the capacitor 12. The pulse cyclic period adjustment unit 16 changes the cyclic period of the pulse voltage according to a change in the measured voltage value.

The renewable power supply 11 means an electric power source using renewable energy such as wind power, hydraulic power, and solar power. The electric power energy outputted from the renewable power supply 11 has a characteristic to change with passage of time.

The electric power energy outputted from the renewable power supply 11 is inputted into the capacitor 12, and the capacitor 12 stores the electric power. The capacitor 12 can be advantageously used for storing the electric power energy since the capacitor 12 is less deteriorated by repetitive use (charging and discharging), and has faster load following capability as compared to a case in which a chemical battery such as a lead-acid battery is used for storing the electric power energy. It is also possible to instantly measure the voltage value at the voltage measurement unit 15.

The electric power stored in the capacitor 12 is inputted into the pulse voltage generation unit 13, and the pulse voltage generation unit 13 generates the pulse voltage having a set amplitude, a set cyclic period, and a set pulse width. Note that a voltage where a thermoneutral point can be maintained during an electrolytic reaction is previously set as the amplitude in the pulse voltage generation unit 13. The cyclic period and the pulse width are set based on a relationship between the amplitude and electric power required for properly operating the electrolytic cell 14.

In the electrolytic cell 14, a solid oxide electrolyte (not shown) is arranged in a center, and a hydrogen electrode and an oxygen electrode are formed on both sides of the solid oxide electrolyte.

The pulse voltage generated in the pulse voltage generation unit 13 is applied to the electrolytic cell 14, and the electrolytic cell 14 generates hydrogen and oxygen by the high temperature steam electrolysis by using the steam supplied into the electrolytic cell.

The voltage measurement unit 15 measures a voltage of the electric power stored in the capacitor 12 during the electrolytic reaction in the electrolytic cell 14. Accordingly, the change in the electric power supplied from the renewable power supply 11 is monitored.

The pulse cyclic period adjustment unit 16 changes the cyclic period of the pulse voltage according to the change in the measured voltage value.

To be more specific, when the measured voltage value is increased, that is, when the electric power supplied from the renewable power supply 11 is increased, the amplitude of the pulse voltage is maintained constant, and the cyclic period of the pulse voltage set in the pulse voltage generation unit 13 is changed to a shorter period. Accordingly, with average electric power consumed in the electrolytic cell 14 being increased, the electrolytic reaction in the electrolytic cell 14 is maintained at the thermoneutral point.

On the other hand, when the measured voltage value is decreased, that is, when the electric power supplied from the renewable power supply 11 is decreased, the amplitude of the pulse voltage is maintained constant, and the cyclic period of the pulse voltage set in the pulse voltage generation unit 13 is changed to a longer period. Accordingly, with the average electric power being decreased, the electrolytic reaction in the electrolytic cell 14 is maintained at the thermoneutral point.

The function of the pulse cyclic period adjustment unit 16 may also be configured so as to be implemented by executing a predetermined program code using an electronic circuit such as a processor, or without being limited to such software processing, a unit or computer implemented by hardware processing using an electronic circuit such as an ASIC or may be configured as a unit or computer implemented by combining software processing and hardware processing.

Figure 2A:
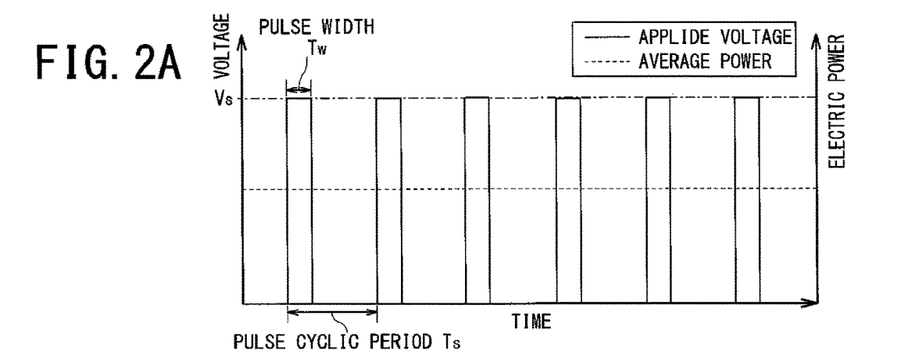
FIG. 2A is a graph illustrating a pulse voltage applied when electric power supplied from a renewable power supply is proper.
Figure 2B:
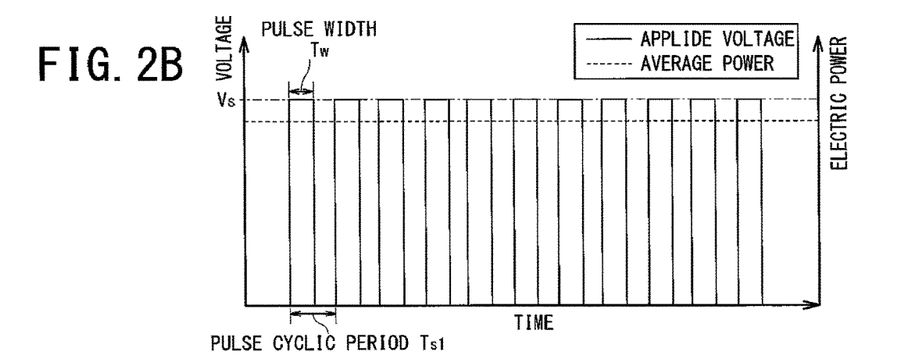
FIG. 2B is a graph illustrating a pulse voltage applied when the supplied electric power is increased.
Figure 2C:
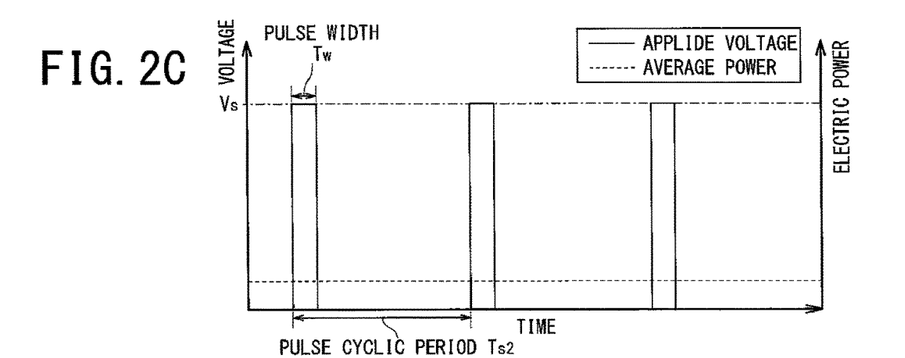
FIG. 2C is a graph illustrating a pulse voltage applied when the supplied electric power is decreased.

FIGS. 2A to 2C are graphs for explaining a change in the pulse voltage in association with a change in the electric power supplied from the renewable power supply 11. In the graphs, a solid line indicates the pulse voltage applied to the electrolytic cell 14, and a dashed line indicates the average electric power consumed in the electrolytic cell 14.

FIG. 2A is a graph illustrating a pulse voltage when the electric power supplied from the renewable power supply 11 is proper. A voltage $V_s$ where the thermoneutral point can be maintained during the electrolytic reaction is set as the amplitude of the pulse voltage. A cyclic period $T_s$ and a pulse width $T_w$ are set based on a relationship between the voltage $V_s$ and the electric power required for properly operating the electrolytic cell 14.

FIG. 2B is a graph illustrating a pulse voltage when the electric power supplied from the renewable power supply 11 is increased. The amplitude of the pulse voltage is maintained constant at the voltage $V_s$, and the cyclic period of the pulse voltage is changed to $T_{s1}$. Accordingly, the average electric power consumed in the electrolytic cell 14 is increased.

FIG. 2C is a graph illustrating a pulse voltage when the electric power supplied from the renewable power supply 11 is decreased. The amplitude of the pulse voltage is maintained constant at the voltage $V_s$, and the cyclic period of the pulse voltage is changed to $T_{s2}$. Accordingly, the average electric power consumed in the electrolytic cell 14 is decreased.

Figure 3:
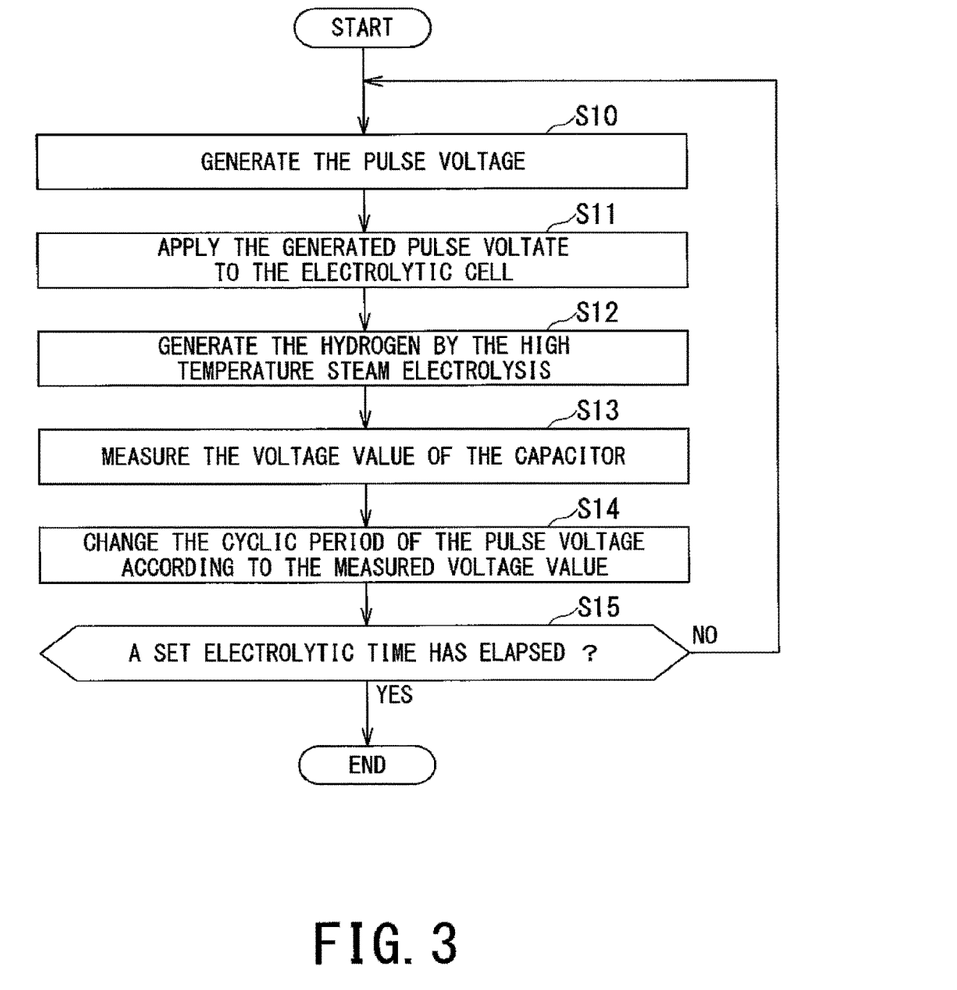
FIG. 3 is a flowchart illustrating a control action of the hydrogen production system according to the first embodiment.

FIG. 3 is a flowchart illustrating a control action of the hydrogen production system 10 according to the first embodiment (see FIG. 1 as appropriate).

The pulse voltage generation unit 13 generates the pulse voltage having the set amplitude, cyclic period, and pulse width (S10).

The generated pulse voltage is applied to the electrolytic cell 14, and the electrolytic cell 14 generates hydrogen by the high temperature steam electrolysis by using the steam supplied into the electrolytic cell (S11, S12).

The voltage measurement unit 15 measures the voltage value of the capacitor 12 during the electrolytic reaction in the electrolytic cell 14 (S13).

The pulse cyclic period adjustment unit 16 changes the cyclic period of the pulse voltage according to the measured voltage value (S14).

The electrolytic reaction is performed with the cyclic period of the pulse voltage being adjusted until a set electrolytic time has elapsed (S15: NO, S10 to S14). When the electrolytic time has elapsed, the electrolytic reaction is terminated by stopping the generation of the pulse voltage (S15: YES).

As described above, the pulse voltage is applied to the electrolytic cell 14 to perform the electrolytic reaction, and the cyclic period of the pulse voltage is changed according to the change in the electric power supplied from the renewable power supply 11. Accordingly, even when the supplied electric power changes with time, the applied voltage required for maintaining the thermoneutral point in the electrolytic cell 14 can be held. It is thus possible to perform a highly-efficient hydrogen production operation.

(Second Embodiment)

Figure 4:
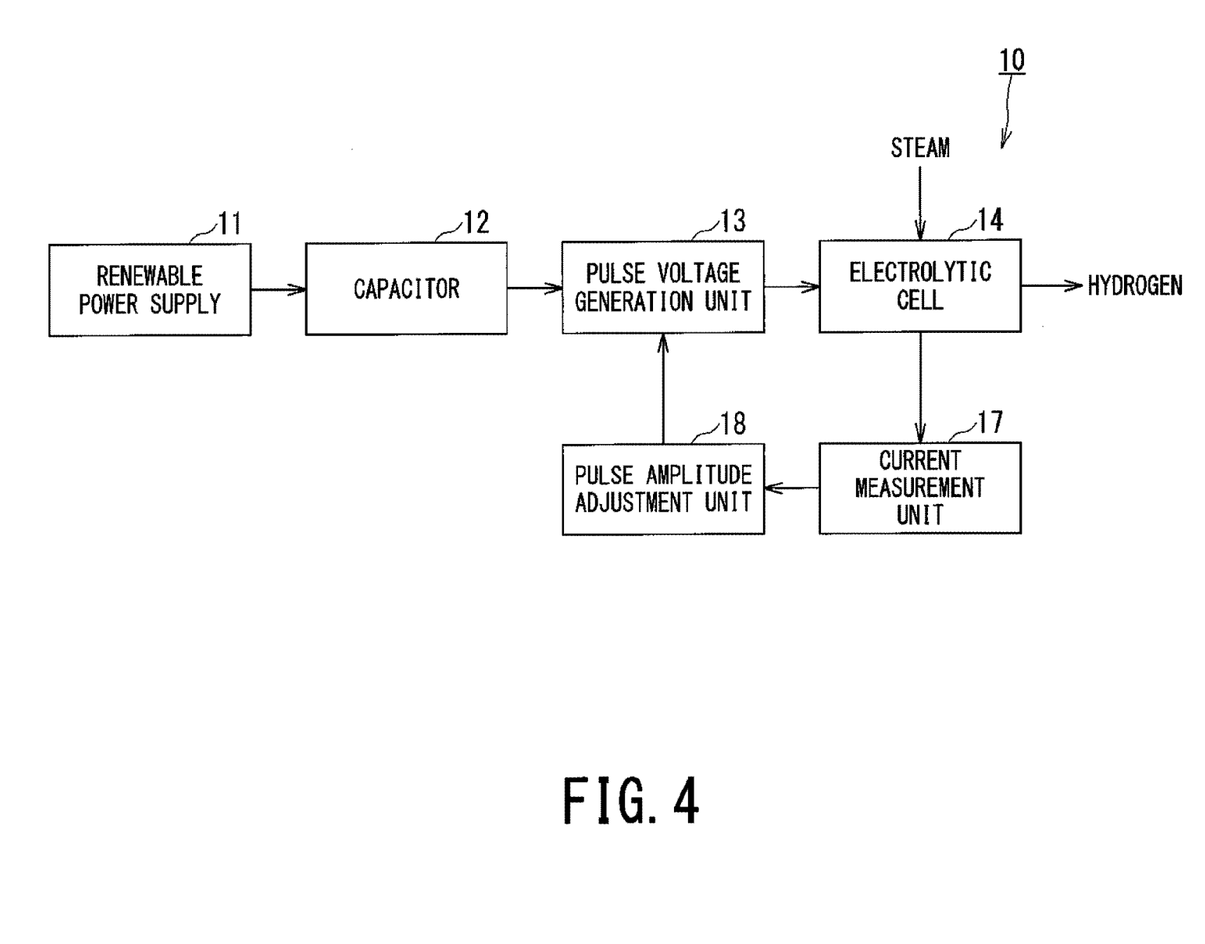
FIG. 4 is a configuration diagram of a hydrogen production system according to a second embodiment.

FIG. 4 shows the hydrogen production system 10 according to a second embodiment. Note that components corresponding to those of the first embodiment are assigned same reference numerals, and an overlapping description is omitted.

A current measurement unit 17 is connected to the electrolytic cell 14, and measures a value of a current flowing through the electrolytic cell 14.

A pulse amplitude adjustment unit 18 changes the amplitude of the pulse voltage so as to obtain an applied voltage corresponding to a flow rate of the steam in the electrolytic cell 14 according to a change in the measured current value.

To be more specific, when the measured current value is higher than a current value required for properly operating the electrolytic cell 14, the flow rate of the steam in the electrolytic cell 14 is determined to be in a surplus state, and the amplitude of the pulse voltage is changed to a higher voltage value. Accordingly, the electrolytic reaction is promoted corresponding to the surplus state of the steam rate.

On the other hand, when the measured current value is lower than the proper value, the flow rate of the steam in the electrolytic cell 14 is determined to be in a steam starvation state, and the amplitude of the pulse voltage is changed to a lower voltage value. Accordingly, the electrolytic reaction is inhibited corresponding to the steam starvation state.

The function of the pulse amplitude adjustment unit 18 may also be configured so as to be implemented by executing a predetermined program code using an electronic circuit such as a processor, or without being limited to such software processing, a unit or computer implemented by hardware processing using an electronic circuit such as an ASIC or may be configured as a unit or computer implemented by combining software processing and hardware processing.

Figure 5A:
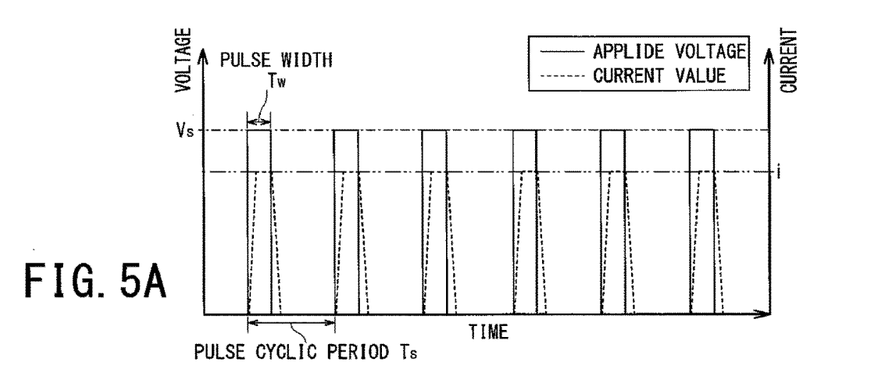
FIG. 5A is a graph illustrating a pulse voltage applied when a rate of steam is proper.
Figure 5B:
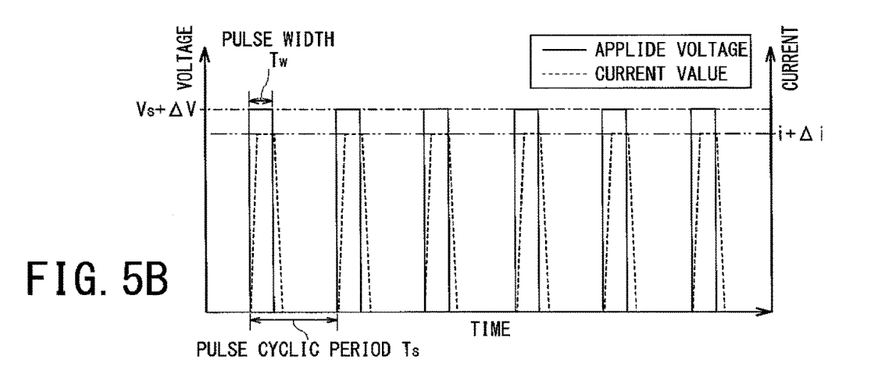
FIG. 5B is a graph illustrating a pulse voltage applied when the rate of steam is excessive.
Figure 5C:
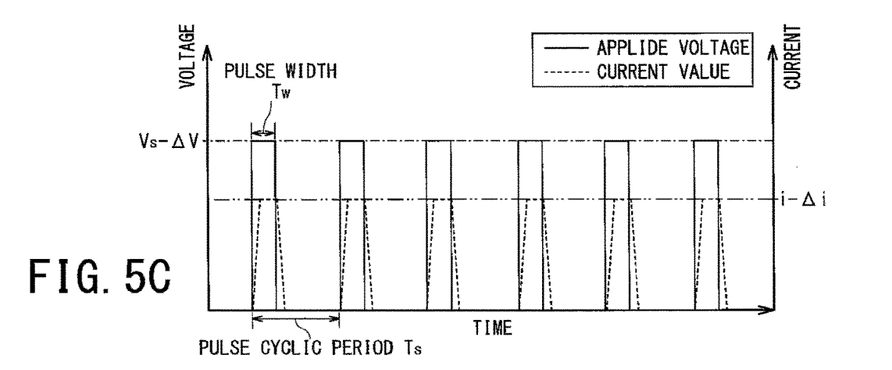
FIG. 5C is a graph illustrating a pulse voltage applied when the steam is depleted.

FIGS. 5A to 5C are graphs for explaining a change in the pulse voltage in association with a change in the current flowing through the electrolytic cell 14. In the graphs, a solid line indicates the pulse voltage applied to the electrolytic cell 14, and a dashed line indicates the current in the electrolytic cell 14.

FIG. 5A is a graph illustrating a pulse voltage when the current value is proper, that is, when the steam rate in the electrolytic cell 14 is proper. The voltage $V_s$ where the thermoneutral point can be maintained during the electrolytic reaction is set as the amplitude of the pulse voltage. A current i corresponding to the applied voltage is measured in the electrolytic cell 14.

FIG. 5B is a graph illustrating a pulse voltage when the current value is increased to $i+\Delta i$, that is, when the steam flow rate in the electrolytic cell 14 is in the surplus state. In this case, the electrolytic reaction is promoted by increasing the amplitude of the pulse voltage to $V_s+\Delta V$.

FIG. 5C is a graph illustrating a pulse voltage when the current value is decreased to $i-\Delta i$, that is, when the steam flow rate in the electrolytic cell 14 is in the steam starvation state. In this case, the electrolytic reaction is inhibited by decreasing the amplitude of the pulse voltage to $V_s-\Delta V$.

Figure 6:
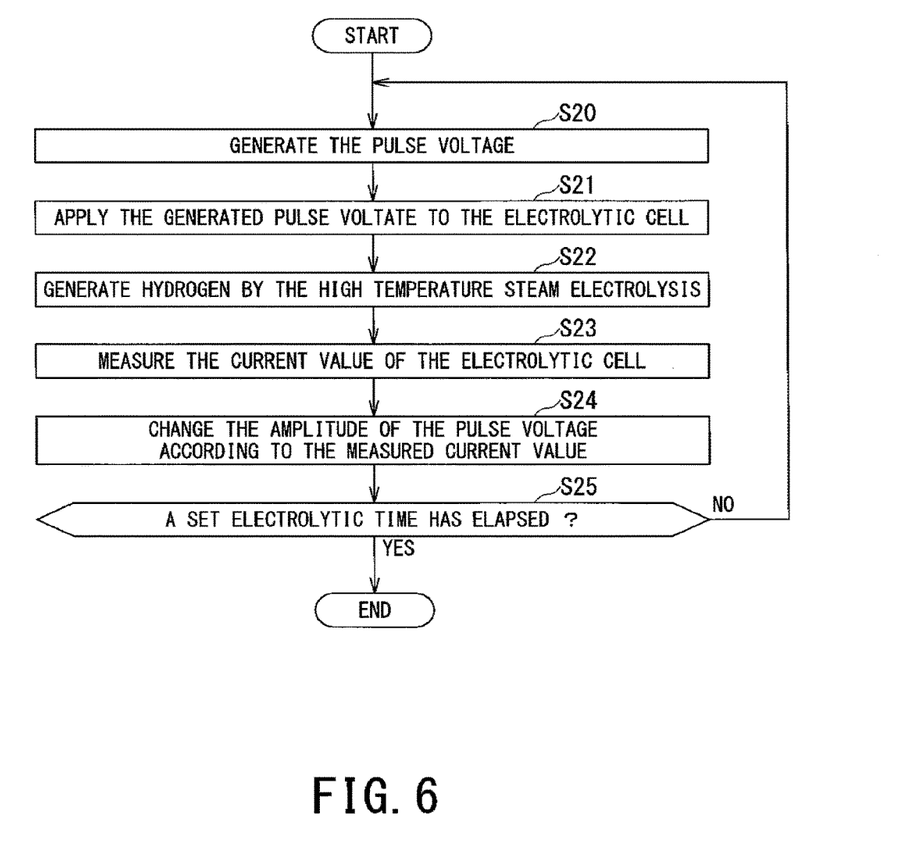
FIG. 6 is a flowchart illustrating a control action of the hydrogen production system according to the second embodiment.

FIG. 6 is a flowchart illustrating a control action of the hydrogen production system 10 according to the second embodiment.

The pulse voltage generation unit 13 generates the pulse voltage having the set amplitude, cyclic period, and pulse width (S20).

The generated pulse voltage is applied to the electrolytic cell 14, and the electrolytic cell 14 generates hydrogen by the high temperature steam electrolysis by using the steam supplied into the electrolytic cell (S21, S22).

The current measurement unit 17 measures the current value of the electrolytic cell 14 during the electrolytic reaction in the electrolytic cell 14 (S23).

The pulse amplitude adjustment unit 18 changes the amplitude of the pulse voltage according to the measured current value (S24).

The electrolytic reaction is performed with the amplitude of the pulse voltage being adjusted until a set electrolytic time has elapsed (S25: NO, S20 to S24). When the electrolytic time has elapsed, the electrolytic reaction is terminated by stopping the generation of the pulse voltage (S25: YES).

As described above, the pulse voltage is applied to the electrolytic cell 14 to perform the electrolytic reaction, and the amplitude of the pulse voltage is changed according to the change in the current in the electrolytic cell 14. Accordingly, even when the steam rate used for the electrolytic reaction varies due to the change in the supplied electric power, an efficient hydrogen production operation according to the steam rate is enabled. Since driving of the electrolytic cell 14 in the steam depleted state is suppressed, maintainability of the electrolytic cell 14 can be improved.

(Third Embodiment)

Figure 7:
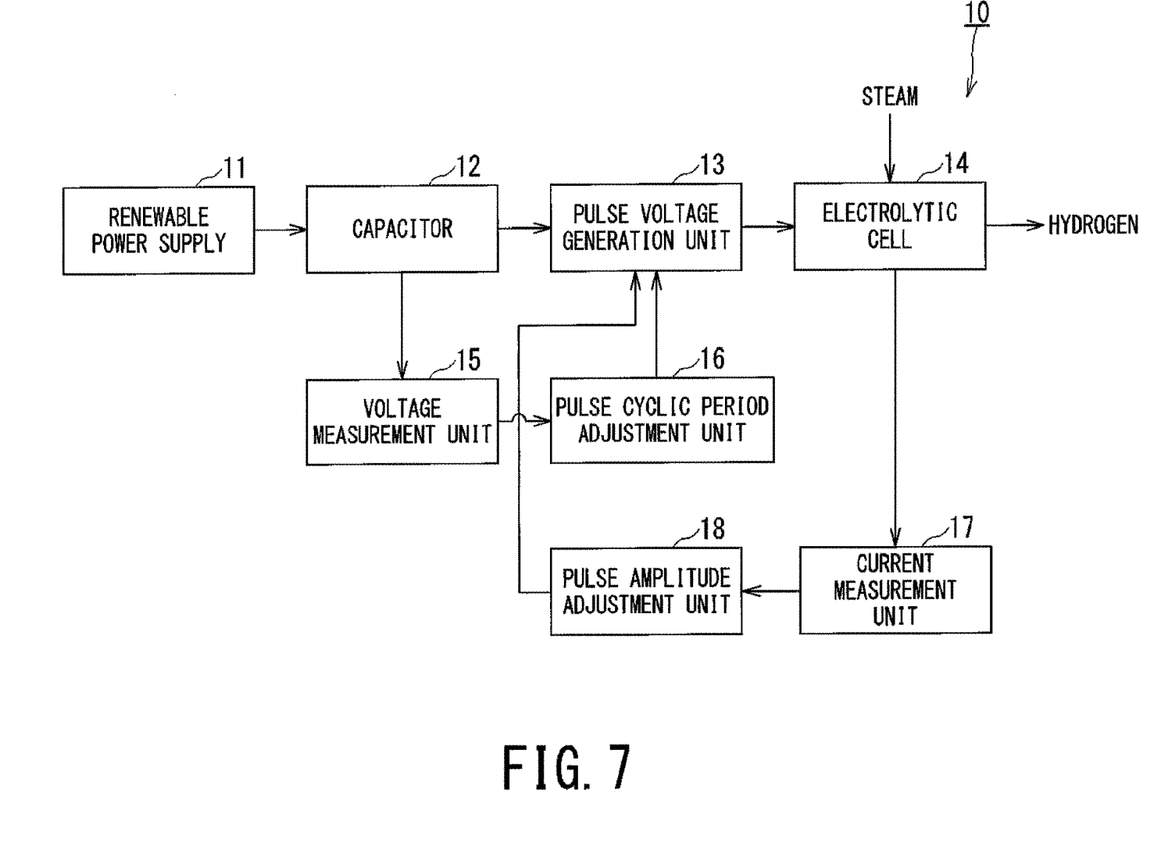
FIG. 7 is a configuration diagram of a hydrogen production system according to a third embodiment.

FIG. 7 shows the hydrogen production system 10 according to a third embodiment. Note that components corresponding to those of the first embodiment (FIG. 1) and those of the second embodiment (FIG. 4) are assigned same reference numerals, and an overlapping description is omitted.

In the third embodiment, the hydrogen production operation is performed by adjusting the cyclic period and the amplitude of the pulse voltage by use of the pulse cyclic period adjustment unit 16 and the pulse amplitude adjustment unit 18 during the electrolytic reaction in the electrolytic cell 14. Note that the pulse amplitude adjustment unit 18 adjusts the amplitude within a range in which the thermoneutral point is maintained.

Figure 8:
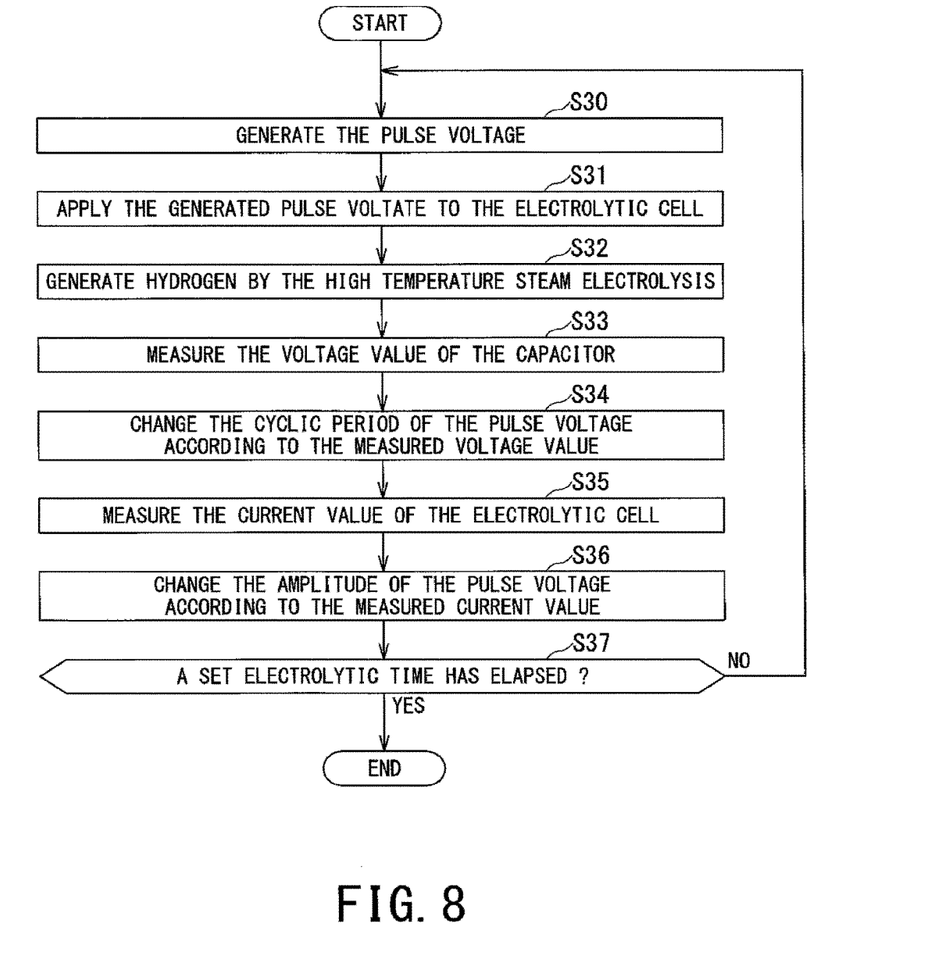
FIG. 8 is a flowchart illustrating a control action of the hydrogen production system according to the third embodiment.

FIG. 8 is a flowchart illustrating a control action of the hydrogen production system 10 according to the third embodiment.

The pulse voltage generation unit 13 generates the pulse voltage having the set amplitude, cyclic period, and pulse width (S30).

The generated pulse voltage is applied to the electrolytic cell 14, and the electrolytic cell 14 generates hydrogen by the high temperature steam electrolysis by using the steam supplied into the electrolytic cell (S31, S32).

The voltage measurement unit 15 measures the voltage value of the capacitor 12 during the electrolytic reaction in the electrolytic cell 14 (S33).

The pulse cyclic period adjustment unit 16 changes the cyclic period of the pulse voltage according to the measured voltage value (S34).

The current measurement unit 17 measures the current value of the electrolytic cell 14 (S35).

The pulse amplitude adjustment unit 18 changes the amplitude of the pulse voltage according to the measured current value (S36).

The electrolytic reaction is performed with the cyclic period and the amplitude of the pulse voltage being adjusted until a set electrolytic time has elapsed (S37: NO, S30 to S36). When the electrolytic time has elapsed, the electrolytic reaction is terminated by stopping the generation of the pulse voltage (S37: YES).

As described above, the pulse voltage is applied to the electrolytic cell 14 to perform the electrolytic reaction, and the cyclic period and the amplitude of the pulse voltage are adjusted. Accordingly, the thermoneutral point is maintained in the electrolytic cell 14, and a more efficient hydrogen production operation according to the steam rate is enabled.

In accordance with the hydrogen production system of the aforementioned respective embodiments, the pulse voltage is applied to the electrolytic cell that performs the high temperature steam electrolysis, and at least one of the cyclic period and the amplitude of the pulse voltage is adjusted. Thus, even when a time-varying electric power source is used, it is possible to achieve the highly-efficient hydrogen production operation.

The embodiments of the present invention have thus been described. However, the embodiments have been presented as examples, which are not intended to limit the scope of the invention. The novel embodiments can be implemented in various other modes. Various omissions, replacements, and changes may be made within the scope without departing from the gist of the invention. The embodiments and modifications are encompassed by the scope and gist of the invention, and included in the invention described in claims and the equivalent scope thereof.

What is claimed is:

1. A hydrogen production system comprising:
   a capacitor inputting electric power energy from a renewable power supply, and storing electric power;
   a pulse voltage generation unit generating a pulse voltage having a set amplitude and a set cyclic period by using the electric power stored in the capacitor;
   an electrolytic cell applying the generated pulse voltage, and generating hydrogen by high temperature steam electrolysis by using steam supplied into the electrolytic cell;
   a voltage measurement unit measuring a voltage value of the capacitor; and
   a pulse cyclic period adjustment unit changing the cyclic period of the pulse voltage according to a change in the measured voltage value,
   wherein the amplitude of the pulse voltage is maintained constant and the pulse cyclic period adjustment unit changes the cyclic period of the pulse voltage to a shorter period when the measured voltage value is increased with respect to maintaining electrolytic reaction in the electrolytic cell at a thermoneutral point, and
   wherein the amplitude of the pulse voltage is maintained constant and the pulse cyclic period adjustment unit changes the cyclic period of the pulse voltage to a longer period when the measured voltage value is decreased with respect to maintaining electrolytic reaction in the electrolytic cell at a thermoneutral point.

2. The hydrogen production system according to claim 1, further comprising:
   a current measurement unit measuring a value of a current flowing through the electrolytic cell; and
   a pulse amplitude adjustment unit changing the amplitude of the pulse voltage according to a change in the measured current value.

3. A method for producing hydrogen comprising:
   inputting electric power energy from a renewable power supply to store electric power in a capacitor;
   generating a pulse voltage having a set amplitude and a set cyclic period by using the stored electric power;
   applying the generated pulse voltage to generate hydrogen by high temperature steam electrolysis in an electrolytic cell by using steam supplied into the electrolytic cell;
   measuring a voltage value of the capacitor; and
   changing the cyclic period of the pulse voltage according to a change in the measured voltage value,
   wherein the amplitude of the pulse voltage is maintained constant and the cyclic period of the pulse voltage is changed to a shorter period when the measured voltage value is increased with respect to maintaining electrolytic reaction in the electrolytic cell at a thermoneutral point, and
   wherein the amplitude of the pulse voltage is maintained constant and the cyclic period of the pulse voltage is changed to a longer period when the measured voltage value is decreased with respect to maintaining electrolytic reaction in the electrolytic cell at a thermoneutral point.

4. The method for producing hydrogen according to claim 3, further comprising:
   measuring a value of a current flowing through the electrolytic cell; and
   changing the amplitude of the pulse voltage according to a change in the measured current value.

* * * * *